Jan. 21, 1958 R. H. PARK 2,820,411
INERTIA RESPONSIVE MAGNETO GENERATOR
Filed Oct. 7, 1948

Inventor
R. H. Park
By M. Hayes
Attorney

United States Patent Office 2,820,411
Patented Jan. 21, 1958

2,820,411

INERTIA RESPONSIVE MAGNETO GENERATOR

Robert H. Park, Hartford, Conn.

Application October 7, 1948, Serial No. 53,321

3 Claims. (Cl. 102—70.2)

(Granted under Title 35, U. S. Code (1952), sec. 266)

The present invention relates to magneto generators and more particularly to a new and improved inertia responsive magneto generator particularly well suited for use with ordnance devices operable upon impact or sudden changes in acceleration or deceleration.

Inertia responsive magneto generators heretofore devised generally have taken the form of an initially closed magnetic circuit for a voltage generating coil in which the magnetic circuit includes an inertia responsive element and a permanent magnet which in some cases is also employed as the inertia responsive element.

In certain of the prior art generators such, for example, as that disclosed in the patent to Edmund L. Zalinski for Magneto-Electric Fuse, No. 384,662, the generating coil is arranged to link all of the flux lines of the initially closed magnetic circuit such that upon movement of the inertia responsive element out of the magnetic circuit, the flux linkages of the coil with the magnetic circuit are suddenly decreased whereupon a voltage is induced in the coil.

Applicant has found that the output of the voltage generating coil may be greatly increased by arranging the inertia responsive element initially in a closed magnetic circuit unlinked with the coil so that the flux linkages with the coil are suddenly greatly increased from substantially zero as the inertia element moves to open the circuit, the flux lines being transferred to a second magnetic circuit including an air path traversing the coil as the element moves.

An object of the present invention is to provide a new and improved inertia responsive magneto generator for firing ordnance devices.

Another object is to provide an inertia responsive magneto generator of this character which is self-contained and therefore is not dependent for its operation on dry cells, storage batteries or the like, and is compact thereby requiring a minimum of space for installation.

A further object is to provide an inertia responsive magneto generator for the firing circuit of an ordnance device in which the magnetic flux is transferred from a first path comprising a closed magnetic circuit having no flux linkage with the voltage generating coil to a second path in which the magnetic flux traverses the coil whereby the flux in the path is substantially linked therewith.

A still further object is to provide an inertia responsive magneto generator for the firing circuit of an ordnance device in which the linkage of the voltage generating coil with the magnetic flux of the magneto generator is effected by the movement of an inertia responsive element out of a closed magnetic circuit for the flux, thereby producing an induced current output from the coil of sufficient amplitude to operate the firing circuit.

A still further object is to provide electrical firing apparatus for ordnance devices which is highly effective for the purpose intended, durable, efficient and simple in operation, and economical to manufacture.

Other objects and many of the attendant advantages of this invention will be readily appreciated as the same becomes better understood by reference to the following detailed description when considered in connection with the accompanying drawings wherein.

Figure 1:
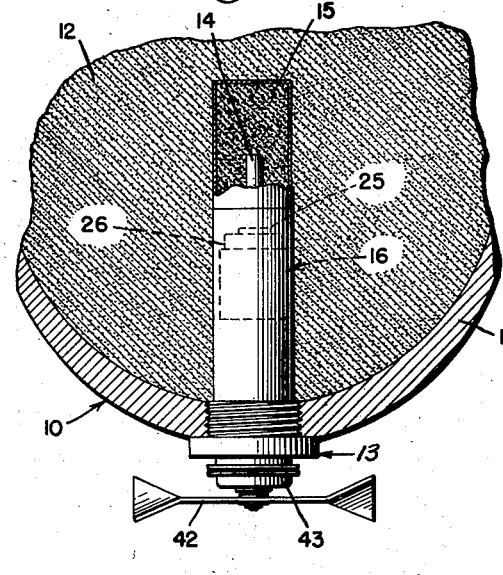
Fig. 1 is a sectional view of the nose portion of a bomb and illustrating a fuze including the magneto generator of the present invention.
Figure 2:
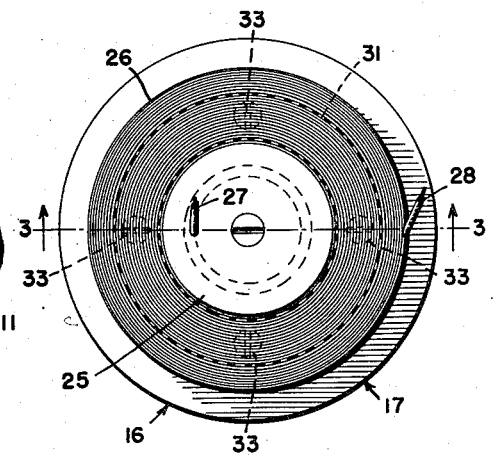
Fig. 2 is a plan view of the magneto generator per se.
Figure 3:
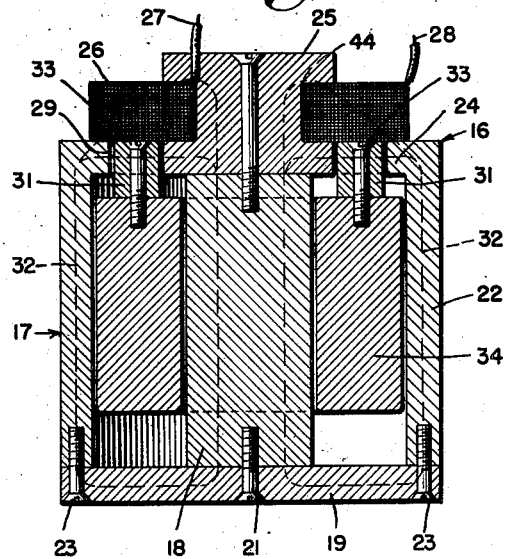
Fig. 3 is a sectional view taken along line 3—3 of Fig. 2.

Referring more particularly to the drawings in which like numerals indicate like parts throughout the several views, 10 indicates generally a bomb having a casing 11 and a main charge 12. Secured in the nose of casing 11 is a fuze 13 having contained therein a detonator 14 and a booster charge 15.

A magneto generator indicated generally at 16 is positioned within fuze 13. Magneto generator 16 comprises a cylindrical housing of ferromagnetic material indicated generally at 17. A permanent magnet 18 is centrally disposed within the housing 17 and is secured to the end wall 19 thereof as by a screw 21. The end wall 19 is secured to one end of the cylindrical portion 22 of housing 17 by screws 23. Cylindrical portion 22 has an inturned flange 24 at the opposite end thereof.

Permanent magnet 18 has a flanged spool-shaped core 25 fastened to its end opposite to the wall 19. Core 25 has wound thereon a generator coil 26 having conductors 27 and 28 leading therefrom to the electric detonator 14. An annular air gap 29 is defined between the flange of cylindrical portion 22 and one of the flanges of core 25. An annular armature ring 31 of ferromagnetic material is normally positioned in air gap 29, thereby to complete or substantially close a first magnetic circuit or flux path for permanent magnet 18, the first flux path thereof being indicated by dash lines at 32, and to shunt the portion of a second magnetic circuit or flux path for the magnet indicated by the dashed lines 44. It will be understood that the air gap is no larger than necessary to provide free movement of the ring in the gap thereby to avoid leakage of the flux and resultant linkage thereof with the coil. Secured to armature ring 29 by screws 33 is an annular inertia member 34 of non-magnetic material such, for example, as brass, member 34 being arranged for free movement within housnig 17 in the direction of end wall 19.

Figure 4:
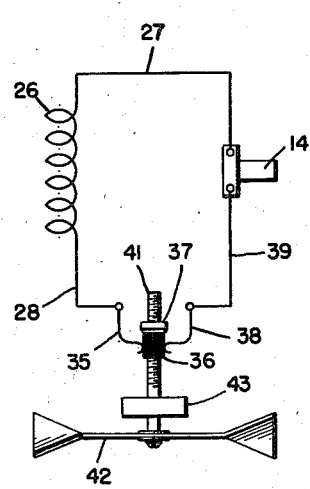
Fig. 4 is a view in diagrammatic form of an electrical firing circuit for the bomb of Fig. 1 and using the magneto generator of the present invention.

The electrical diagram of Fig. 4 illustrates a simplified arrangement of an electrical firing circuit for use with the magneto generator of the present invention. The generator coil 26 is connected to one side of detonator 14 by conductor 27. The other end of coil 26 is connected by conductor 28 to wiper contact 35 which normally bears against insulating sleeve 36 of movable switch conductor member 37. On the other side of sleeve 36 a wiper contact 38 bears thereagainst. Conductor 39 connects contact 38 with the other side of detonator 14. Switch member 37 is threadedly engaged with screw-shaft 41, the shaft being rotated by an impeller 42 as the bomb 10 falls from a launching aircraft. In order to provide a sufficient time delay before arming the circuit a reduction gear 43 may be interposed between shaft 41 and impeller 42.

In the operation of the device, it is, of course, apparent that the circuit, as illustrated in Fig. 4 is in an open or unarmed condition before the bomb leaves the aircraft. It is also apparent that as the shaft 41 is rotated by impeller 42 as the bomb falls through the air, the movable conductor member 37 moves to its circuit closing position wherein it bridges the gap between contacts 38 and 35 and thereby arms the circuit.

As the bomb strikes the surface of the water, inertia element 34 is suddenly moved forward in response to the set forward force due to the impact, thereby withdrawing armature 31 from air gap 29. When this occurs, the flux in the magnetic circuit initially closed by the armature, moves to a second path bridging air gap 29 in a predetermined manner effective to traverse coil 26 in sufficient quantity to induce in the coil a current sufficient to fire detonator 14 thereby to fire the bomb.

A particular advantage of the arrangement of the present invention results from the positioning of the coil 26 in such a manner that with the armature 31 in the closed magnetic circuit position, there is substantially no flux linkage between the coil and the magnetic circuit; whereas when the armature is moved from the initial or closed circuit position, a substantial portion of the flux lines are caused to follow a new path or circuit traversing coil 26. Thus, the coil produces a large voltage output by reason of the sudden change from zero flux linkage to a substantial linkage with the magnetic circuit.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. An inertia controlled magneto generator for the firing circuit of an ordnance device comprising, in combination, a ferromagnetic housing of hollow cylindrical formation one end thereof being closed the other end being open and having an inturned flange, a cylindrical permanent magnet axially aligned within said housing and secured at one end to the closed end of the housing, a flange spool-shaped member of ferromagnetic material mounted on the other end of said magnet, an armature ring of ferromagnetic material normally positioned between one of the flanges of the spool-shaped member and the inturned flange of the housing thereby to close the magentic circuit from the magnet through the housing, an inertia ring of non-magnetic material secured to the armature ring and positioned for free movement within the housing axially of the magnet, and an induction coil arranged in said firing circuit and wound on the spool-shaped member whereby a firing voltage is induced in the firing circuit as the armature is suddenly moved out of the magnetic circuit upon impact of the ordnance device with its target.

2. An inertia responsive magnet generator comprising, in combination, a cup-shaped ferromagnetic member having an inturned flange on the lip portion thereof, a cylindrical permanent magnet secured on one end thereof to the bottom portion of said cup member centrally thereof and terminating at the other end flush with the inner surface of said flange, a spool-shaped ferromagnetic core member secured to said other end of the said magnet coaxially therewith thereby to define an annular air gap between said flange and the inner flange portion of the core member, a coil wound about said core member, an annular ferromagnetic member disposed in said air gap thereby to shunt the magnetic flux of said magnet whereby substantially none of said flux threads through said coil until said annular member is moved out of the air gap, and a non-magnetic inertia responsive member loosely sleeved about said magnet and secured to said annular member for suddenly withdrawing the annular member from the air gap as inertia forces are applied to the magneto generator thereby to generate a voltage in said coil proportional to the rate of change of flux linkages of the coil with the flux of the magnet.

3. An inertia responsive magnet generator comprising, in combination, a ferromagnetic member, a permanent magnet, means for securing said magnet at one end thereof to said ferromagnetic member, a core member secured to said magnet at the opposite end thereof, a coil wound on said core member, said magnet and said ferromagnetic member defining an air gap, a movable ferromagnetic member initially mounted in and substantially filling said air gap thereby to shunt the magnetic flux of said magnet from said coil, and means for moving said movable member out of said air gap whereby the flux of said magnet is caused to flow through said coil thus generating a voltage in said coil.

References Cited in the file of this patent
UNITED STATES PATENTS

| 384,662 | Zalinski | June 19, 1888 |
| 2,404,553 | Wales | July 23, 1946 |

FOREIGN PATENTS

| 506,280 | France | May 26, 1920 |
| 525,333 | Great Britain | Aug. 27, 1940 |